(12) United States Patent
Ore (10) Patent No.: US 10,036,178 B2
(45) Date of Patent: Jul. 31, 2018

(54) EXPANDING STRUCTURES, AND DEVICE AND METHOD FOR EXPANDING THE SAME

(71) Applicant: Moshe Ore, Alfey Menahse (IL)

(72) Inventor: Moshe Ore, Alfey Menahse (IL)

(*) Notice: Subject to any disclaimer, the term of this patent is extended or adjusted under 35 U.S.C. 154(b) by 322 days.

(21) Appl. No.: 14/891,358

(22) PCT Filed: May 18, 2014

(86) PCT No.: PCT/IL2014/050431
§ 371 (c)(1),
(2) Date: Nov. 15, 2015

(87) PCT Pub. No.: WO2014/188409
PCT Pub. Date: Nov. 27, 2014

(65) Prior Publication Data
US 2016/0097214 A1     Apr. 7, 2016

Related U.S. Application Data

(60) Provisional application No. 61/825,043, filed on May 19, 2013.

(51) Int. Cl.
*B29C 44/08* (2006.01)
*E04H 15/20* (2006.01)
(Continued)

(52) U.S. Cl.
CPC .............. *E04H 15/20* (2013.01); *B29C 44/08* (2013.01); *B29C 44/181* (2013.01); *B65B 3/00* (2013.01);
(Continued)

(58) Field of Classification Search
CPC .............. E04H 15/20; E04H 2015/203; E04H 2015/205; E04H 2015/206;
(Continued)

(56) References Cited

U.S. PATENT DOCUMENTS 2,812,769 A * 11/1957 Schaefer ................. E04H 15/20
135/115
3,388,509 A * 6/1968 Mora ....................... B28B 7/32
264/314
(Continued)

FOREIGN PATENT DOCUMENTS

| CA | 2474628 A1 | 8/2003 |
| DE | 19843996 A1 | 3/2000 |
| GB | 2172925 A | 10/1986 |
| WO | 03104702 A1 | 12/2003 |

*Primary Examiner* — Christine T Cajilig
(74) *Attorney, Agent, or Firm* — The Roy Gross Law Firm, LLC; Roy Gross (57) ABSTRACT

Devices for accumulating material within a limited space, such that at most insignificant amount of material leaves the device prior to the device being at full capacity. One embodiment comprises an expandable structure to be filled, comprising a material receiving member for receiving expansible material, such that the expansible material is inserted into the member and expands within the member prior to part of the material exiting the material receiving member into another member, wherein the expansible material expands and rigidizes within the material receiving member and within the another member to form a rigid structure having a required form.

22 Claims, 8 Drawing Sheets

(51) Int. Cl.
*E21F 17/107* (2006.01)
*B29C 44/18* (2006.01)
*B65B 3/00* (2006.01)
*E02D 29/00* (2006.01)
*B29K 23/00* (2006.01)
*B29K 27/06* (2006.01)
*B29K 75/00* (2006.01)
*B29L 25/00* (2006.01)

(52) U.S. Cl.
CPC ............ *E02D 29/00* (2013.01); *E21F 17/107* (2013.01); *B29K 2023/12* (2013.01); *B29K 2027/06* (2013.01); *B29K 2075/00* (2013.01); *B29L 2025/00* (2013.01); *E04H 2015/201* (2013.01)

(58) Field of Classification Search
CPC . E04H 2015/207; B29C 44/08; B29C 44/181; B29C 44/184; B29C 44/38; B29C 44/385; E21F 17/107
See application file for complete search history.

(56) References Cited

U.S. PATENT DOCUMENTS

| | | | | |
|---|---|---|---|---|
| 4,061,310 | A * | 12/1977 | Vetter | B66F 3/35 254/93 HP |
| 4,773,792 | A * | 9/1988 | Landers | E02D 29/1409 405/229 |
| 5,093,055 | A * | 3/1992 | Skiff | B29C 44/184 264/275 |
| 5,412,822 | A * | 5/1995 | Kelly | A47C 4/54 5/654 |
| 6,463,699 | B1 | 10/2002 | Bailey et al. | |
| 7,169,344 | B2 * | 1/2007 | Coon | B29C 44/184 264/263 |
| 7,721,749 | B2 | 5/2010 | Brewin et al. | |
| 7,735,265 | B2 | 6/2010 | Tinker et al. | |
| 2005/0029148 | A1 * | 2/2005 | Rust | B65D 81/3272 206/523 |
| 2012/0291362 | A1 * | 11/2012 | Milo | E04B 1/165 52/2.18 |

* cited by examiner

EXPANDING STRUCTURES, AND DEVICE AND METHOD FOR EXPANDING THE SAME

TECHNICAL FIELD

Embodiments of the disclosure relate to expanding structures and to a method and devices for filling the expanding structures.

BACKGROUND

Various situations require the fast, cheap and efficient erection of structures, including for example tent-like structures for survivors of natural disasters such as earthquakes.

In other situations, a structure for blocking tunnels may be required, and other situations may call for other structures.

The structures have to be rigid, for example at least to a degree that a human being cannot break or destroy it easily.

On the other hand, such structures may not be pre-erected, due to high storage requirements, wear and tear, and transportation and deployment limitations. Thus, the structures have to be in collapsed state at which they may be easily stored and transported, ready for deployment at or near the intended usage site.

The erection process should be fast so as to enable efficient deployment for one or a multiplicity of structures, and should not require professional manpower such as engineers or other professionals.

In other situations, it may be required to spread large quantities of materials over vast areas, for example to flood water or another material over large areas in order to extinguish fire.

BRIEF SUMMARY

One aspect of the disclosed subject matter relates to an expandable structure to be filled, comprising, a material receiving member for receiving expansible material, such that the expansible material is inserted into the member and expands within the member prior to part of the expansible material exiting the material receiving member into another member, wherein the expansible material expands and rigidizes within the material receiving member and within the another member to form a rigid shape having a required form. Within the structure, the material receiving member is optionally a hose-like sturdy device having linear slots parallel to a longitudinal direction of the member. Within the structure, the expansible material is optionally rigidizing foam. Within the structure, the expansible material is optionally a mixture of polyol and isocyanate which create Polyurethane when rigidizing. Within the structure, the expansible material optionally comprises chlorofluoroalkane. Within the structure, the material receiving member is optionally made of PVC. The structure may further comprise an external layer encompassing the material receiving member, wherein space formed between the external layer and the material receiving member may receive materials through the openings in the material receiving member, and wherein the external layer is optionally easily breakable. Within the structure, the external layer is optionally made of polypropylene. Within the structure, the expansible material is optionally a mixture of two liquids provided to the material receiving member through a mixer. The structure may be used for a tent skeleton wherein the expansible material is optionally a rising rigidizing material, and wherein the expansible material optionally fills the material receiving member to capacity, the external layer and at least one space formed as part of a tent structure. The tent skeleton may further comprise two side edges, a front arc, a rear arc and a top spine. The tent skeleton may comprise a top spine support member or a back sill. The tent skeleton may comprise internal wiring. The tent skeleton may comprise a solar panel located on an external side of the space. Within the structure, the material receiving member optionally limits initial volume of the expansible material, and once the material receiving member is filled due to expansion of the expansible material, the material receiving member opens to let the expanding material to the other compartment. The structure is optionally a bag-like structure, comprising at least one sieve-like patch located corresponding to an opening in the bag-like structure. The structure may further comprise a filling device for filling the material receiving member. Within the structure, the expansible material optionally fills the material receiving member and the other member, and leaks through the openings to attach the bag-like structure to a wall. Within the structure, the bag-like structure optionally comprises a folding grille which unfolds as the bag-like structure fills. Within the structure, the bag-like structure, except for the openings is optionally made of impermeable material.

The structure is optionally formed as a triangular prism to be used as a ramp for loading or unloading freight to or from an elevated location.

Another aspect of the disclosure relates to an expansible structure to be filled, comprising, a material receiving member for receiving expansible material, wherein the expansible material rigidizes within the material receiving member and the structure forms a triangular prism to be used as a ramp for loading or unloading freight to or from an elevated location. Within the structure, the expansible shape optionally comprises a multiplicity of material receiving members. Within the structure, the expansible shape optionally comprises a multiplicity of material receiving members arranged horizontally on each other, such that the topmost member is of a substantially right-angled triangular prism shape, and additional members are of a right-angled trapezoid prism shape. Within the structure, the multiplicity of material receiving members are optionally interconnected.

Yet another aspect of the disclosure relates to an expansible structure for blocking a tunnel by a block of formed material.

BRIEF DESCRIPTION OF THE SEVERAL VIEWS OF THE DRAWINGS

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

DETAILED DESCRIPTION

An aspect of some embodiments of the disclosure relates to controlling no the expansion of materials. In some embodiments, expending materials are collected in a limited volume of a full available volume. The expansion process starts within the limited volume, thus providing for first filling a partial volume and ensuring the material fills a required shape, and improving the expansion due, among others, to the exothermic nature of the expansion process. Once the material expanded and filled the limited volume, it may expand further by breaking open the boundaries of the limited volume, and filling the overall available volume.

Thus, one embodiment of the disclosure relates to expansible structures and a device and method for expanding the same. The extensible structures may be tents used for example as temporary dwelling for natural-disaster stricken areas. Other embodiments relate to an expansible structure for blocking a tunnel or another limited space, or the like. In some embodiments, the structures may be filled with material such as rigidizable foam, or any other material which may be stored and transported in non-rigidizing form for example in a liquid form, and may harden when exposed, mixed with another material, or the like. In some embodiments, the material may expand prior to or during rigidizing, so that only a relatively small volume of material has to be transported for filling larger structures.

The material may be Polyurethane, manufactured by mixing polyol and isocyanate wherein the isocyanate may be di-isocyanate, for example Methylene diphenyl di-isocyanate, optionally with some blowing agent such as chlorofluoroalkane. In other embodiments, materials such as water may be used. It will be appreciated that other materials that may also be used, wherein the materials may be released at certain quantity and required timing. In some embodiments, the Polyurethane may be provided to the expansible structure via a device that provides for accumulation of the material in liquid form in areas according to a required shape, for example a skeleton of the structure, followed by simultaneous release of the material into multiple areas of the structure thus filling or blocking the structure or part thereof.

In some exemplary embodiments, the skeleton may be implemented from a two-layer hose. In some embodiments, the inner layer may be made for example of PVC. The hose may initially be in collapsed state but may assume a radial cross section when expanded. The hose may comprise linear openings, for example linear rifts or cracks parallel to the direction of the flow within the hose. The second layer, external to the first layer may be made, for example, of polypropylene or another easily tearable or otherwise operable or breakable material. The external layer may be made of one, two or more sheets of material, sewn along one two or more lines.

The rigidizable material may be streamed along the internal layer of the hose structure. The material may be provided, for example from a truck or from a dedicated container, which may connect to the inner layer by a corresponding connector. The flow is prioritized, such that the main advancement direction of the material is along the hose, and minimal quantity leaks through the rifts, until the internal layer is full. Once the internal layer is full due to the provided material and optionally due also to the rising and expansion of the material, larger quantities of material leak through the rifts into the external layer. Once the external layer starts to fill, it may tear for example due to the small stitching holes or due to the pressure built within. Due to the easily tearable nature of the external layer, once it starts tearing at a location, the tear easily proceeds along the entire length, such that the expansible or rising material may fill the volume in which the hose structure is located, for example a tent sewn of woven fabric, technical fabric, fabric used for parachutes or umbrellas, or the like.

In another exemplary embodiment, the rigidizable material is streamed into a substantially empty bag-like structure, having one or more net-like or sieve-like patches. Once the rigidizable material expands and rises, the bag structure fills and expands, the material leaks through the sieve-like patches and streams into the available volume, for example into the internal of a tunnel in which the bag is located. The material within and external to the bag structure then rigidizes or hardens, attaches the structure to the tunnel walls and blocks the tunnel.

In some embodiments, the bag structure may also be equipped with an internal expansible grille attached to the bag on its internal or external side, such that the grille expands with the expansion of the bag, and adds extra strength to the rigid structure, thus making it harder for a person to cut and remove the block of material.

In another embodiment, a hose having an internal layer with slots or other openings and an external easily tearable layer may be placed in an optionally covered canal at or near a watershed or a mountain top. In case of fire, water or another fluid may be streamed into the hose. The preferred advancement direction of the fluid is along the hose, while a small quantity of water may leak through the slots into the external layer. Once the full length of the hose is filled with fluid, more fluid may leak into the external layer, and when the external layer is filled, it tears and the fluid fills the canal substantially along its full length. Then, due to the pressure, a cover of the canal, if one is used may rise up and the water may spill downhill, thus extinguishing the fire.

The disclosed structures and method utilize accumulating material which may be water or pre-risen expanding material, in a required structure, for example by filling a hose configured in a required structure. During, but mainly after the material fills the available space within the structure, the material may leak into an external volume through slots, cracks, sieves or any other opening, and continue to fill the available space, which may be limited in at least one dimension by an external layer or by available structure such as a tunnel. In some embodiments, the external layer, if any, may be torn so that the material may continue to fill the space within the area encompassing the structure. The method provides for accumulating the material in spaces arranged as required, before allowing it to expand or spill, such that the expansion or spilling occurs in all parts of the structure. In some embodiments, due to the structure, the expansion may occur substantially simultaneously at all parts. When the material is a rigidizing material, this provides for substantially uniform distribution of the material, regardless of the part of the structure from which it is filled, and avoiding problems with areas that have already rigidized and thus block access to other areas.

If the material is a rigidizing material, such as rigidizing foam, the resulting structure is a solid structure such as a tent-structure which can serve as temporary housing, a tunnel block, or the like.

It will be appreciated that while rising, a rigidizable material, such as the Polyurethane, generates heat, and on the other hand heat may improve the rising process of the polyurethane. Therefore, accumulating the pre-risen material in a limited space may provide for improved rising conditions, resulting in larger volume, faster rigidizing, or enhanced strength.

Figure 1:
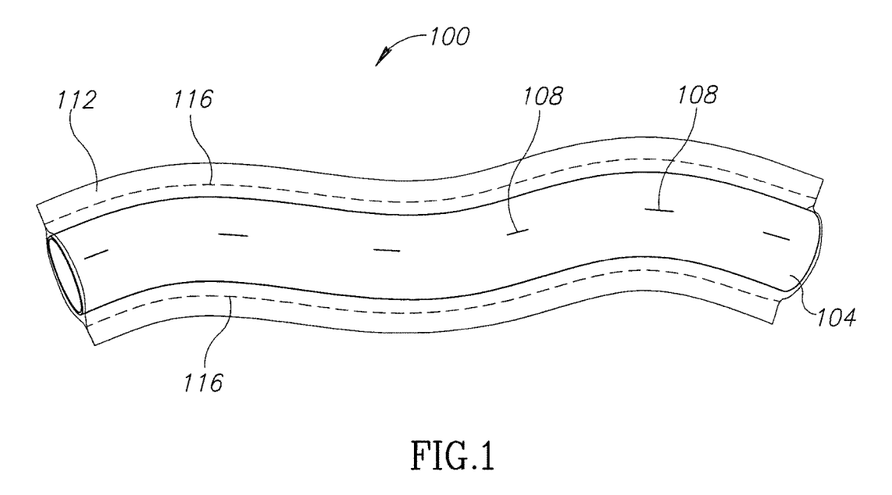
FIG. 1 shows a side view of a hose structure for filling expansible structures, in accordance with some exemplary embodiments of the disclosure.

Referring now to FIG. 1, showing an exemplary embodiment of a two-ply hose 100 used for distributing fluid in a uniform manner within a structure.

The hose may contain an internal layer made for example of PVC. The internal layer 104 may be stored and transported in a collapsed form, to save storage and shipping space, and avoid further problems such as air blocking the hose and preventing free flow within the hose.

Layer 104 may have thereon slots, cracks or other openings 108 through which the material may leak from internal layer 104. However, openings 108 may be designed such that when fluid is supplied to the hose, larger amounts of fluid stream along the hose than leak through the openings. For example, the openings may be cuts through internal layer 104, which run in parallel to the longitudinal axis of the hose.

In some exemplary embodiments, the radius of internal layer 104 may be 8-30 mm, and slots 108 may be about 5-30 mm long, and may be located at about 2-15 cm apart.

When internal layer 104 is filled to capacity, the pressure within internal layer 104 increases, and more liquid starts leaking through openings 108.

Hose 100 may further comprise external layer 112, which may be easily tearable. For example, it may be made of polypropylene, which once it starts to tear, continuing the rip requires very little pressure. External layer 112 may be made of two or more sheets sewn together along two or more seams 116, or a single sheet having two parallel sides sewn to each other. Once layer 112 is filled to capacity, it may start tearing for example at one or more of the stitches along seams 116. The tear may then easily continue, thus dispersing the fluid to the surrounding.

Thus, by providing an internal layer with openings arranged such that the preferred flow direction of fluid is along the hose rather than through the openings, the internal layer fills along the full length and structure of the hose, prior to large quantities leaking or otherwise flowing into the external layer. This provides for creating a skeleton full of material for a structure such as a tent prior to filling the structure surrounding the skeleton.

Figure 2A:
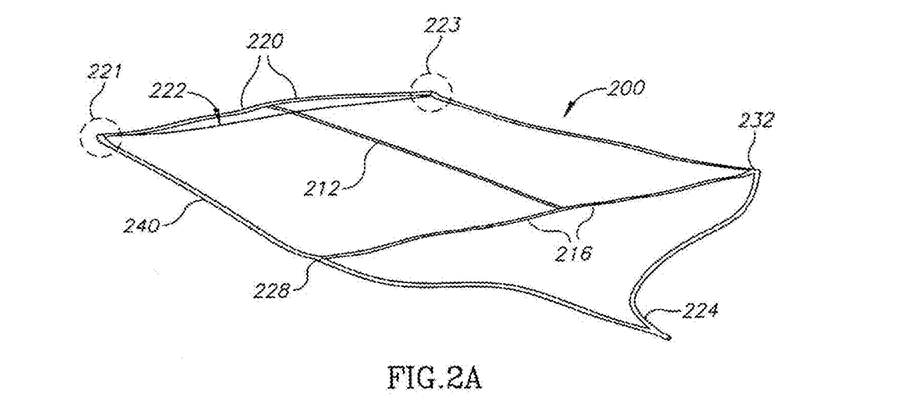
FIG. 2A is an illustration of an exemplary embodiment of a tent skeleton, in accordance with some exemplary embodiments of the disclosure.

Referring now to FIG. 2A, showing an exemplary embodiment of a tent skeleton 200, made for example of the hose shown in FIG. 1. The tent skeleton comprises two side base edges 204 and 208 which run in parallel to the longitudinal axis of the tent, top spine 212 also running in parallel to the longitudinal axis of the tent, front arc 216 and back arc 220. The structure may further comprise sill 222, designed to connect areas 221 and 223, wherein sill 222 is shorter than top arc 220, thus causing top arc 220 to indeed assume arc shape when filled.

The fluid, such as the rigidizable liquid which hardens into rigid foam, may be streamed into the skeleton via hose 224, connected by connectors 228 and 232 of tent skeleton 200. On its other end, hose 224 may connect to one or more sources of the fluid making of the rigidizable foam, such that the fluids mix within tent skeleton 200. Tent skeleton 200 may be arranged such that any point within the structure can be reached from at least two directions, such that an unexpected block at any point does not cause any part of the skeleton to remain empty.

Further, when fluids get to an area from two directions, the streams merge and the resulting rigid mass is unified and seamless.

Figure 2B:
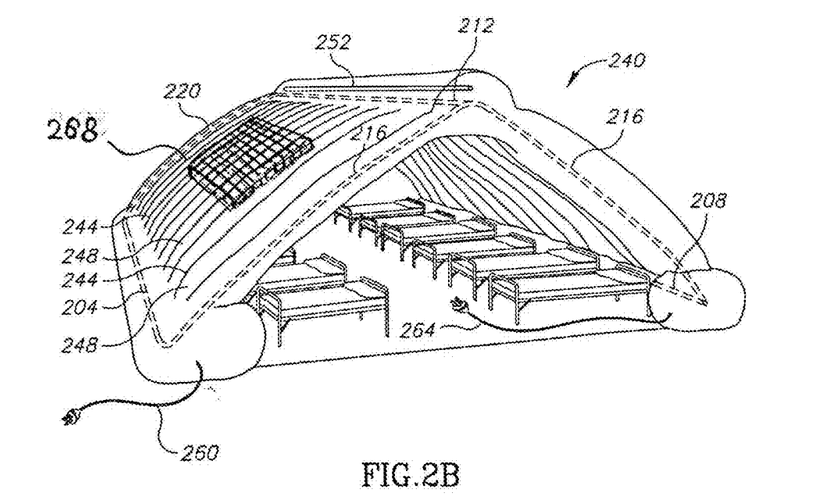
FIG. 2B is an illustration of an exemplary embodiment of a tent, in accordance with some exemplary embodiments of the disclosure.

Referring now to FIG. 2B, showing a tent 240 comprising therein the tent skeleton of FIG. 2A, which skeleton may be made of the hose structure of FIG. 1.

Tent 240 may be made of any sturdy fabric, such as woven fabric, technical fabric, fabric used for parachutes or umbrellas, impermeable fabric, or the like. Tent 240 may be sewn or otherwise comprised of two fabric layers, connected for example by sewing, welding, or the like, at the edges and along additional lines, such as lines 244, thus creating ribs-like structure comprising ribs 248. It will be appreciated that ribs 248 may be connected and form one or more larger spaces, such that there may be flow between the ribs, and material coming out of the hose spreads within all ribs and is not limited to the area near the hose. Thus, the resulting tent may eventually comprise substantially uniformly spread rigid material. However, depending on the structure, some areas may be designed to contain more material than other areas.

The tent may further comprise a top spine support 252 made of rigid material such as aluminum. In some embodiments, top spine support 252 may be provided in a piecewise manner such that the pieces may connect or otherwise extend each other, for example in a telescopic structure. Top spine support 252 may be useful in preventing sinking of the top spine 212 of the tent skeleton which may occur if top spine 212 is long, for example exceeding 50 cm. It will be appreciated that the tent skeleton may comprise additional or different supporting features.

The tent skeleton within tent 240 may be made in accordance with skeleton 200 of FIG. 2A, of the hose shown in FIG. 1, or another hose having the same behavior of accumulating the material in a required shape and then letting it fill the space. Thus the internal part of the hose is filled to capacity before letting significant amount of material to leak, and once significant amount has leaked, it is accumulated within the external layer and then let relatively easily to spread within the available space created by ribs 248. It will be appreciated that the disclosed tent skeleton is exemplary only and is not intended to limit the scope of the disclosure. It will also be appreciated that many other structures, including but not limited to an igloo-shape may be designed which use the disclosed principles.

In some embodiments, tent 240 may further comprise pre-wired wiring or hoses, as well as corresponding inlets and outlets for providing utilities at the internal or external part of the tent, such as electricity, communication, network, gas, water, sewage or others. For example, tent 240 may comprise one or more electrical inlets 260 to which a generator may be connected, and internal wiring ending at one or more outlets such as outlets 264 and 268 to which electrical devices may be connected. When the generator is connected and turned on, the electrical devices may be connected and used. The internal wiring may be arranged such that once the tent is erected, the required utilities may be input at one or more inlets and consumed from one or more selected outlets in the tent.

Some of the external areas of tent 240 may comprise solar panels 268 for absorbing sunlight which may be used for generating electricity, heating water, or other uses. The solar panels may be connected to the wires or hoses such that the generated electrical current or hot water may be used.

In some embodiments, the structure of tent 240 may have blank parts or parts made of different materials, to be used for example as windows. Blank parts provide for open windows, while transparent parts may provide for close windows that let in light. In some embodiments tent 240 may comprise parts not fully connected to the main body of the tent, thus providing for windows that may be opened or closed. Similarly, tent 240 may comprise one or more such areas to be used as doors which may be opened or closed.

In some embodiments, expending materials are collected in a limited volume of the full available volume. The expansion process starts within the limited volume, thus improving the expansion due, among others, to the exothermic nature of the expansion process. Once the material expanded and filled the available volume, it may expand further by breaking open the boundaries of the limited volume, and filling the overall available volume. For example, the limited volume may have boundaries sewed with weak stitches, tight folding, weak undercut or other closing or obstacle that opens under pressure exceeding a predetermined level.

Figure 3A:
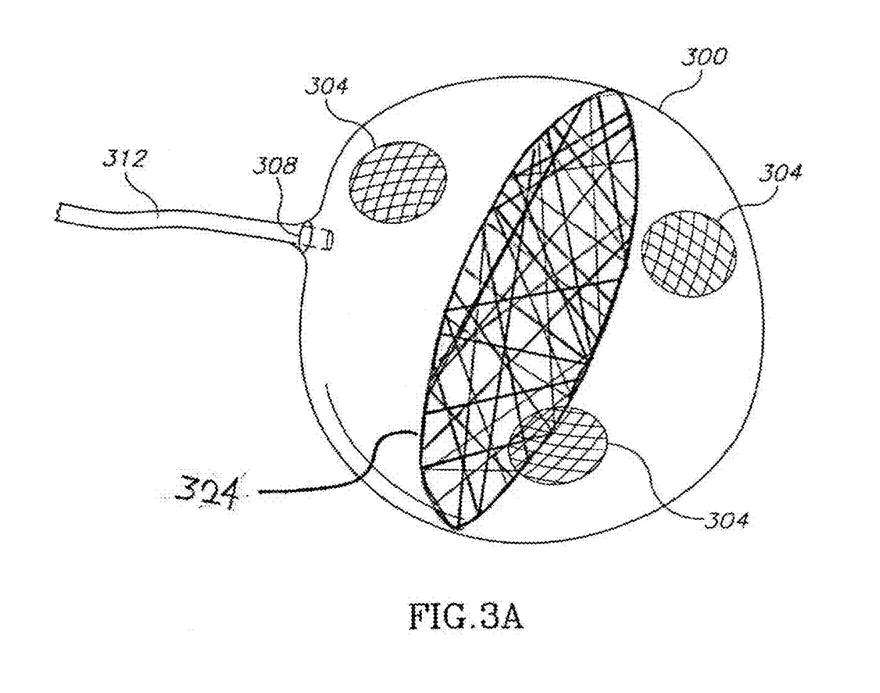
FIG. 3A is an illustration of a device for blocking limited longitudinal structures, in accordance with some exemplary embodiments of the disclosure.

Referring now to FIG. 3A, showing a device for blocking limited longitudinal structures, such as pipes, tunnels, or the like, having any cross section, such as substantially round, elliptic, square, or of any amorphous shape.

The device comprises a bag-like structure 300 of a required size. Bag-like structure 300 may be made substantially round or cube-like. Bag-like structure 300 may be made of any sturdy fabric, such as woven fabric, technical fabric, fabric used for parachutes or umbrellas, impermeable fabric, or the like.

Bag-like structure 300 may contain as part of its structure patch areas 304, which patches are made of net, sieve or another perforated area. It will be appreciated that the fabric of bag-structure 300 has openings in the areas of patches 304, such that the openings within patch 304 provide for material transfer from bag-structure 300 outwards.

Bag-like structure 300 may connect at connection 308 to hose 312, which may be used for streaming fluid such as expandable rigidizable foam into bag-like structure 300.

Bag-like structure 300 may initially be stored and transported in a crimped, folded or otherwise collapsed state, such that it takes minimum volume, and such that it is easier to be filled since no air or other gases have to be pushed out.

When the material is streamed into bag-like structure 300, bag-like structure 300 first fills to capacity, with little material leaking through patch areas 304. Once bag-like structure 300 is filled and some pressure is built inside, the filling material starts leaking more intensively through patch areas 304, thus attaching bag-like structure to the available space.

Bag-like structure 300 may have attached to its internal or external side a folding grille 324 which may be made for example of metal such as iron, aluminum, or the like. When bag-like structure 300 is at its collapsed initial crumpled state, folding grille 324 is also at its folded state. When bag-like structure 300 expands due to the pressure of the rising of the expandable material, folding grille 324 opens too. If folding grille 324 is at the internal side of bag-like structure 300, the rising material surrounds it, and folding grille 324 becomes part of the structure, thus giving it extra strength.

Alternatively or additionally, the expandable rigidizing material may be supplemented with irritating material such as pepper to further eliminate humans or other organisms from trying to destroy the block.

Figure 3B:
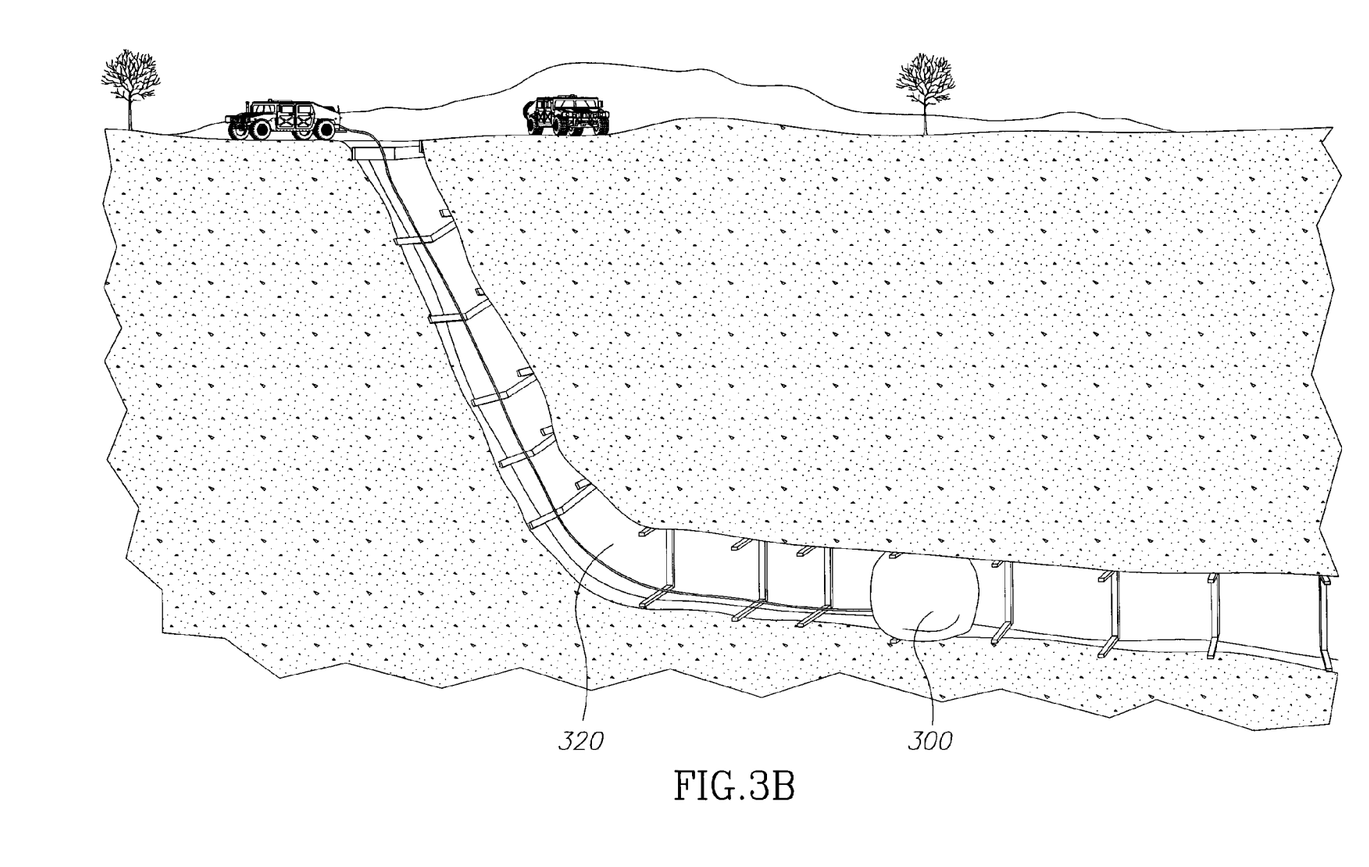
FIG. 3B is an illustration of the device of FIG. 3A in deployed state within a tunnel, in accordance with some exemplary embodiments of the disclosure.

Referring now to FIG. 3B, showing bag-like structure 300 in expanded state within a tunnel 320. Bag-like structure 300 may be initially placed with one or more patches 304 facing the tunnel walls, such that the material that leaks through patches 304 firmly attaches bag-like structure 300 to the tunnel walls.

It will be appreciated that once bag-like structure 300 is full and blocks the tunnel, and once the rigidizable material hardens, the tunnel may be flooded with water or another liquid at one or two ends.

In some embodiments, structure 300 may comprise an inner structure having easily openable side or edge. The hardening materials may expand and mix or harden within the inner structure, and when the material volume exceeds the volume of the inner structure, the inner structure may tear or otherwise break, thus letting the material spread within the entire structure. It will be appreciated that letting the material expand within a limited area may provide for better expansion due to the exothermic nature of the expansion process.

The disclosed structure may be used for blocking a tunnel, as well as for channel blasting. Once the tunnel is blocked, a blast at one side of the block may be activated which may not affect the other side, thus providing for partial or selective blasting.

In some embodiments, the rigidizable material may be a mixture of two materials such as polyol and isocyanate, which hardens when the materials mix. In order to prevent premature mixing and hardening, the materials may be provided separately and mixed within the bag-like or the partial structure. The materials may be input separately into a mixer and may be output from the mixer in one stream.

Figure 3C:
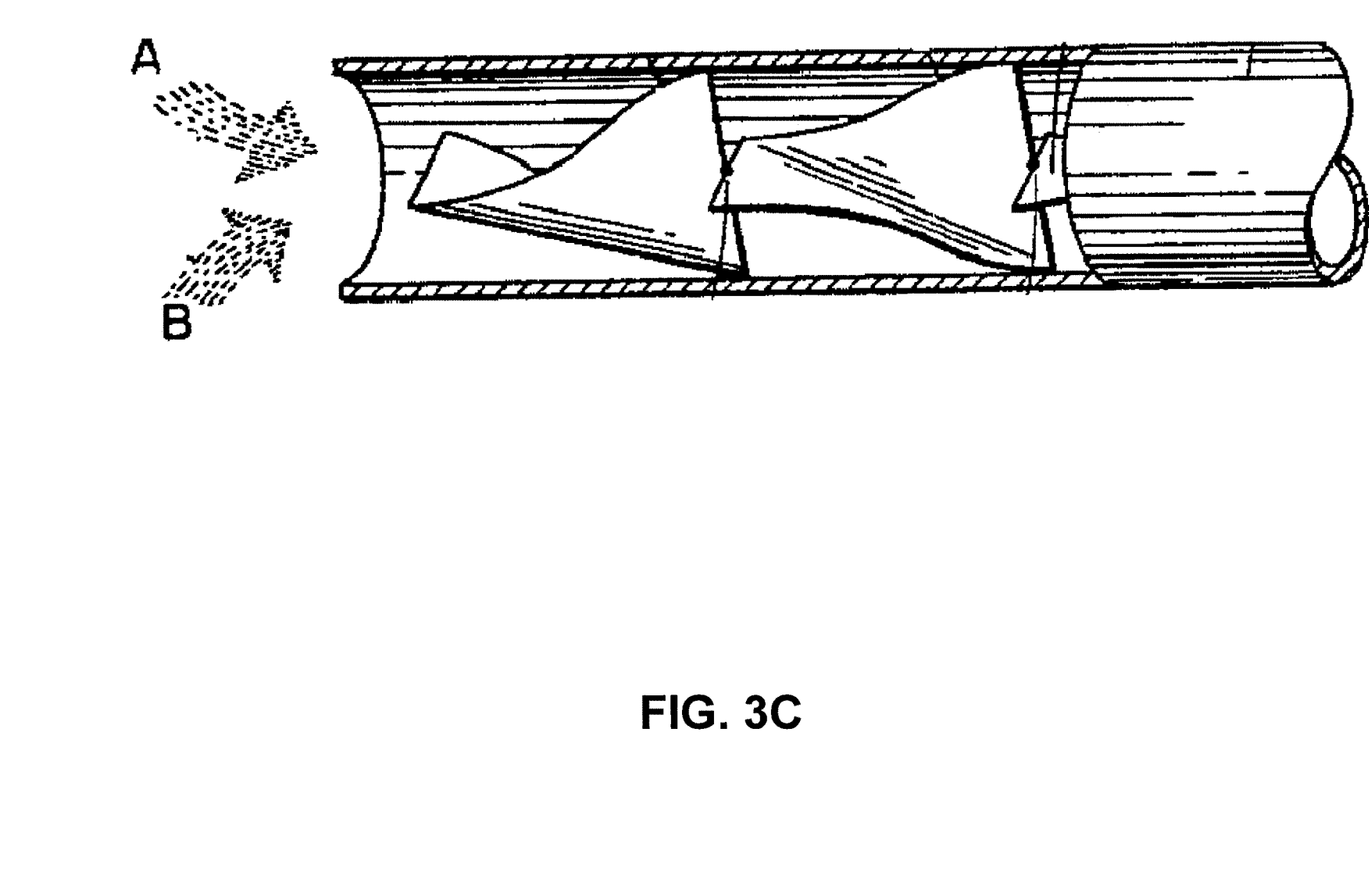
FIG. 3C is an illustration of a mixer for mixing two or more materials, in accordance with some exemplary embodiments of the disclosure.

The mixer may be a dynamic mixer which actively mixes the materials. Alternatively, a static mixer such as shown in FIG. 3C may be used. The structure shown in FIG. 3C may provide for receiving two streams A and B and repeatedly splitting and uniting streams, such that the particles of the two original streams mix. The fluids to be mixed may be liquid or gas streams and may comprise solid parts or particles. The energy needed for mixing comes from pressure loss of the fluids flowing through the mixer. Static mixers may be implemented as a plate-type mixer or as a cylindrical (tube) or squared housing, such as shown in FIG. 3C. Typical construction materials for static mixer components may include stainless steel, polypropylene, Teflon, PVDF, PVC, CPVC and polyacetal. Flow division in a static mixer that uses baffles is a function of the number of elements in the mixer. In some embodiments, a static mixer may comprise a series of baffles made of metal or a variety of plastics. Similarly, the mixer housing can be made of metal or plastic. The housed-elements design incorporates inlets for delivering two or more streams of fluids into the static mixer. As the streams move through the mixer, the non-moving elements continuously blend the materials. A static mixer may be implemented as disclosed, for example, in U.S. Pat. No. 3,286,992 incorporated herein by reference, or along the detailed guidelines. Active mixers may mix two or more materials by rotating, spinning or otherwise moving blades. In some embodiments, a combination of mixing solutions may be used.

The materials may be provided to the mixer by a pump pumping the materials from containers, using gravitation if the container is placed higher than the mixer, or using any other force for pushing the materials into the mixer.

Figure 4A:
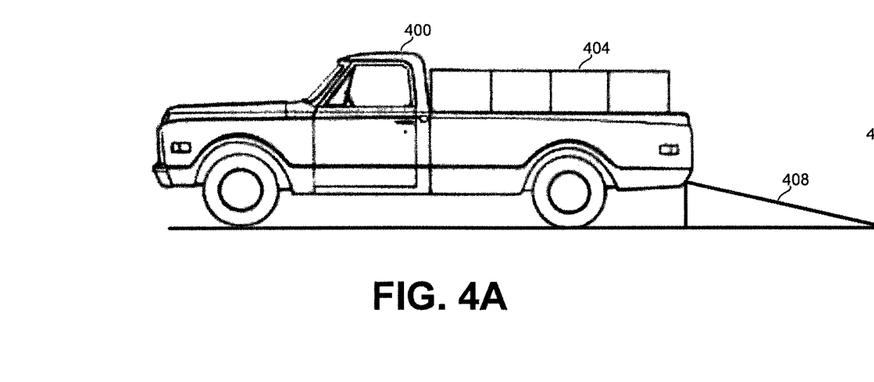
FIG. 4A is a schematic illustration of a truck to be unloaded and a structure for unloading the truck, in accordance with some exemplary embodiments of the disclosure.

Referring now to FIG. 4A, showing a truck 400 carrying freight 404 to be unloaded from truck 400 to the ground, to another vehicle, or the like. Freight 404 may comprise, for example, cars or other wheeled equipment, boxes, or the like.

In order to unload freight 404, a ramp 408 is provided. Conventional ramps are solid and take up a lot of space. In order to support unloading heavy freight, the ramp itself is usually sturdy and heavy.

In addition, it may not always be guaranteed that a ramp is available at the location in which it is required to unload the freight. Thus, in many cases the truck has to carry also the ramp, thus reducing the volume and weight of the actual freight it may carry. Yet another problem relates to unloading the ramp itself from the truck.

In accordance with some embodiments of the disclosure, there is thus provided an expansible ramp 408 having a collapsed empty state, and filled only prior to use. It will be appreciated that FIG. 4A is exemplary only and that ramp 408 may be used for loading or unloading freight to or from other trucks, semitrailers or any other elevated surfaces.

It will be appreciated that the ramp may also be used for loading freight into a truck, a semi-trailer, a trailer or another leveled surface.

Figure 4B:
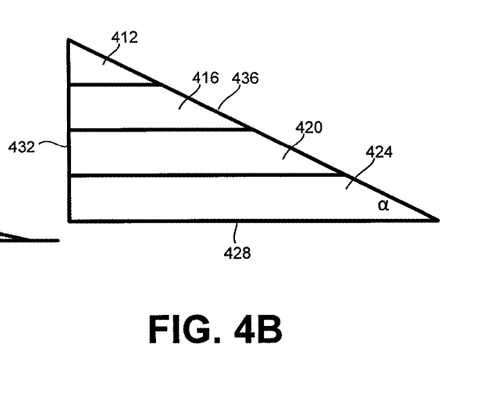
FIGS. 4B and 4C show schematic side view and isometric view of an unloading ramp, in accordance with some exemplary embodiments of the disclosure.
Figure 4C:
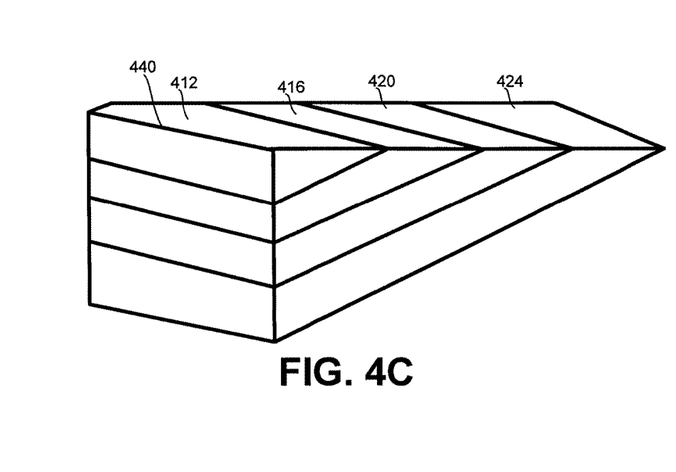

The ramp may have an external shape of a right-angled triangular prism, in which vertical 432 of the triangle is of length substantially equal to the height from which the fright is to be unloaded. Vertical 428 of the triangle may be as short as possible but yet of sufficient length such that hypotenuse 436 of the triangle is sloped at an angle α in which the freight may be unloaded safely. In some embodiments, α may be for example, between about 20° to about 30°.

Height 440 of the prism may be smaller or equal to the width of the truck or of the freight to be unloaded.

The ramp may be filled, as in the preceding examples, at the time and place in which it is required, by a mixture of two or more materials wherein the materials are provided in a liquid or gas form and may contain solid parts or particles, and only after mixing them the mix expands and hardens to create a solid volume. As detailed above, the materials may be provided from containers using pumps, gravity, injection or another mechanism, and may be streamed into the ramp through a mixer, to ensure adequate mixing.

The empty ramp and the materials may be carried by the truck or may be available at the loading or unloading location. Since the hardened material may be foam-like, the volume and weight of the collapsed ramp structure and the liquids to be mixed is small and can be carried by the truck without significantly reducing the volume and weight of the actual freight.

In order to make the ramp structure when expanded as close as possible to the triangular prism, the ramp may be divided into two or more compartments, such as compartments 412, 416, 420 and 424, wherein each compartment may be filled separately. In such arrangement, the compartments may be arranged horizontally above each other, wherein the topmost compartment is shaped as right-angled triangular prism and lower compartments may be shaped as right-angled trapezoid prisms.

Compartments 412, 416, 420 and 424 may have a common external envelope, or may be attached to each other along common faces. Each compartment may have a separate filling opening for inserting the rigidizable rising material.

Filling each compartment separately may also provide for faster rigidization, since filling the whole ramp as one compartment will create a large mass of mixed materials which may take a much longer time to rigidize. In addition, collecting a large volume of material may create excessive heat which may be dangerous and which may take a long time to disperse.

Depending on the filling materials and the freight to be loaded or unloaded, the resulting ramp may be shaped to be strong enough such that the freight may be loaded or unloaded safely whether using its own wheels, over a separate wheeled device, or in any other manner. It will however be appreciated that the ramp may slightly sink due to the freight weight.

It will be appreciated that the compartments may be interconnected by openings, tubes, or other connections, in order to equate the internal pressures created within each compartment to the pressure in neighboring compartments.

Thus, the liquid materials within each compartment are mixed, expand up to the available volume of the compartment, and become rigid. The whole ramp, comprised of the compartments is then substantially shaped as a right-angled triangular prism.

In some embodiments, a generic ramp may be provided having a multiplicity of compartments, such that only the required compartments are filled so that the full ramp is of the height required to load or unload the freight from the truck. It will be appreciated that if not all compartments are filled, the upper compartments, including the top one shaped as a triangular prism have to be filled, and lower ones may be skipped.

It will be appreciated that the separate compartments may be filled with different materials or material combinations. For example, upper compartments may be filled with harder materials, and lower compartments may be filled with softer materials, in order to absorb shocks or pressures of the freight weight.

Figure 4D:
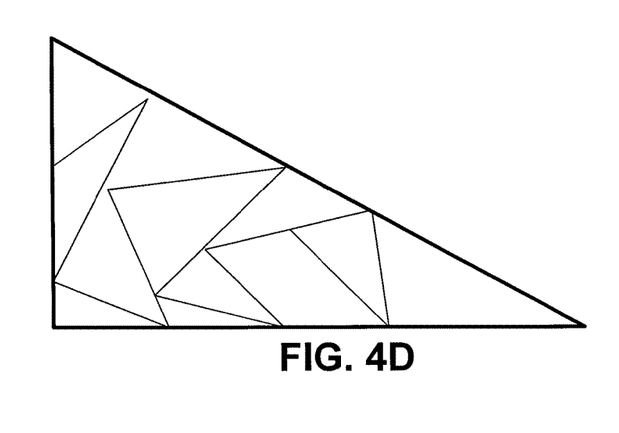
FIG. 4D is a schematic side view of another embodiment of the unloading ramp, in accordance with some exemplary embodiments of the disclosure.

It will be appreciated that the ramp does not necessarily have to be divided into horizontal compartments. Rather, it may be divided into any arbitrarily shaped compartments as shown in FIG. 4D, as long as each compartment has an opening or an external surface through which it may be filled. In some embodiments, one or more compartments may be filled from an internal opening, such that when dilled the material automatically moves to another compartment.

The ramp may be fixed to the truck, to the ground or to another object by straps, buckles, clasps, or the like.

Figure 5A:
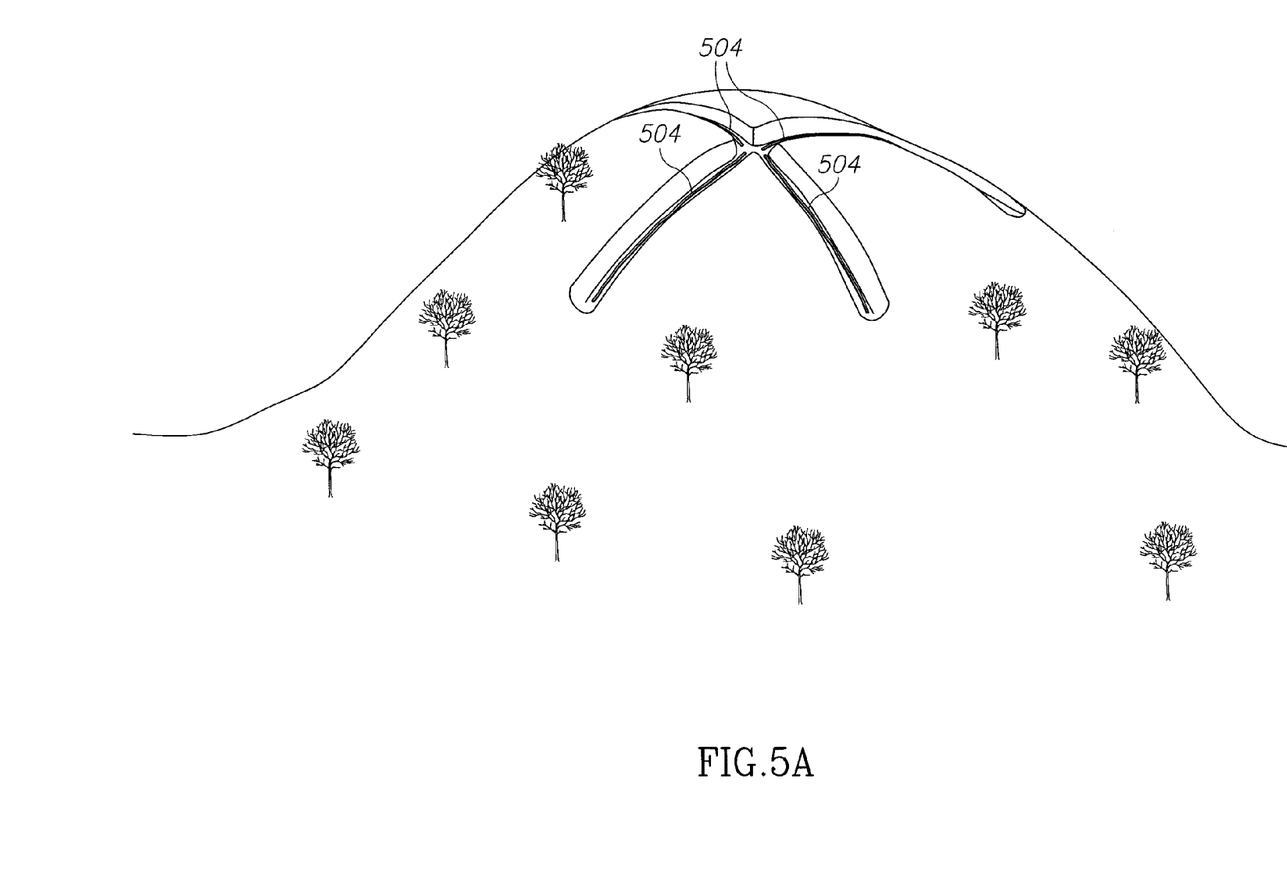
FIG. 5A is an illustration of a mountain top area with canals for containing a host structure, in accordance with some exemplary embodiments of the disclosure.

Referring now to FIG. 5A, showing a system for accumulating water for extinguishing fires in hilly or mountainous areas.

The system may comprise a hose which may be similar to the hose shown in FIG. 1, located within and in parallel to one or more ditches 504 in the ground, dug near, around or in proximity to a mountain top or watershed. Hose 500 may be folded or otherwise packed into ditches 504, but may be of such dimensions so as it does not fit within ditches 504 when the hose is filled to capacity.

Figures 5B, 5C:
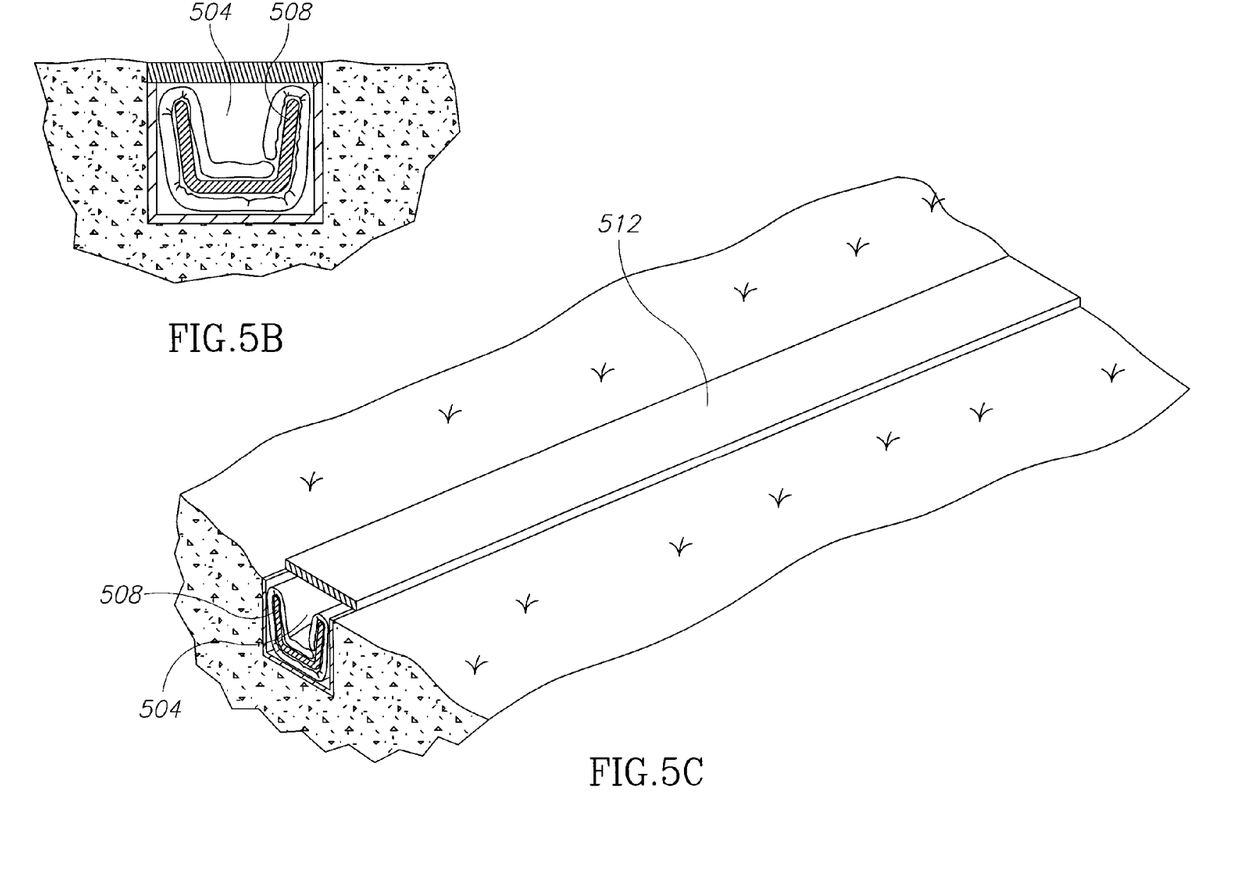
FIGS. 5B and 5C are a side view and an isometric view, respectively, of a hose within a ditch, in accordance with some exemplary embodiments of the disclosure.

Referring now to FIGS. 5B and 5C, showing a side view and an isometric view, respectively, of ditch 504 with hose 508 packed therein. When hose 508 is packed and not in use, ditches 504 may be covered with a sturdy but lightweight cover 512, designed to prevent people or animals from falling into any of ditches 504.

Hose 458, which may be constructed similarly to hose 100 of FIG. 1, may comprise an internal sturdy layer with openings thereon, and an external layer which is easily tearable. The openings in the internal layer may be arranged such that the flow along the internal layer is prioritized over leaking through the openings. Thus, when fluid such as water is streamed through the internal layer, the internal layer is filled to capacity throughout its length before significant quantities leak through the openings. Once the internal layer is filled to capacity throughout its length, more significant amounts leak to the external layer, thus causing the external layer to spread. Since hose 508 is designed so as not to fit within ditch 504 when hose 508 is filled, hose 508 may pop up and optionally push up cover 512 covering ditch 504, if such cover is present. Once the external layer fills to some degree, it may tear along significant parts of its length, such that the fluid may spill from the ditch along its length. If ditch 504 is stretched near or along a mountain top or a watershed, the water may wash the surface, thus extinguishing the fire.

The figures illustrate the architecture, functionality, and operation of possible implementations of systems and devices according to various embodiments of the present disclosure. In this regard. It should also be noted that, in some alternative implementations, the functionality provided by the different components may be achieved using similar or other components, different materials or different dimensions without deviating from the principles of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any combination of one or more components may be utilized.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed.

Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An expandable structure to be filled, comprising,
   a material receiving member for receiving expansible material, such that the expansible material is inserted into the member and expands within the member prior to part of the expansible material exiting the material receiving member into another member; and
   an external layer encompassing the material receiving member, wherein space formed between the external layer and the material receiving member receives materials through openings in the material receiving member, and wherein the external layer is tearable as a result of the expansion of the expansible material,
   wherein the expansible material expands and rigidizes within the material receiving member and within the another member to form a rigid shape having a required form.

2. The structure of claim 1, wherein the material receiving member is sturdy and is shaped as a hose having linear slots parallel to a longitudinal direction of the member.

3. The structure of claim 1 wherein the expansible material is rigidizing foam.

4. The structure of claim 1 wherein the expansible material is a mixture of polyol and isocyanate which create Polyurethane when rigidizing.

5. The structure of claim 4 wherein the expansible material further comprises chlorofluoroalkane.

6. The structure of claim 1 wherein the material receiving member is made of PVC.

7. The structure of claim 1 wherein the external layer is made of polypropylene.

8. The structure of claim 1 wherein the expansible material is a mixture of two liquids provided to the material receiving member through a mixer.

9. The structure of claim 1, wherein the material receiving member is shaped as a tent skeleton, wherein the expansible material is a rising rigidizing material, and wherein the expansible material fills the material receiving member to capacity, the external layer and at least one space formed as part of a tent structure.

10. The structure of claim 9, wherein the tent skeleton comprises two side edges, a front arc, a rear arc and a top spine.

11. The structure of claim 9, wherein the tent skeleton further comprises a top spine support member or a back sill.

12. The structure of claim 9, wherein the tent skeleton comprises internal wiring.

13. The structure of claim 9, wherein the tent skeleton comprises a solar panel located on an external side of the space.

14. An expandable structure to be filled, comprising,
    a material receiving member and a second member, the material receiving member receiving expansible material which expands within the material receiving member prior to part of the expansible material exiting the material receiving member into the second member,
    wherein the expansible material expands and rigidizes within the material receiving member and within the second member to form a rigid shape having a required form,
    wherein the material receiving member limits initial volume of the expanding material, and once the material receiving member is filled due to expansion of the expanding material, the material receiving member opens to let the expanding material to the second member, and wherein the material receiving member comprises openings and wherein the material receiving member comprises a folding grille which unfolds as the material receiving member and the second member fill.

15. The structure of claim 14, wherein the openings are covered by at least one patch comprising a sieve.

16. The structure of claim 14, further comprising a filling device for filling the structure.

17. The structure of claim 14, wherein the expansible material fills the material receiving member and the second member, and leaks through the openings to attach the structure to a wall.

18. The structure of claim 14, wherein the structure, except for the openings is made of impermeable material.

19. The structure of claim 1, wherein the material receiving member is a triangular prism to be used as a ramp for loading or unloading a freight to or from an elevated location.

20. An expansible shape to be filled, comprising,
a material receiving member for receiving expansible material wherein the expansible material rigidizes within the material receiving member, and the structure forms a triangular prism to be used as a ramp for loading or unloading a freight to or from an elevated location,
wherein the expansible shape comprises a multiplicity of material receiving members arranged horizontally on each other, such that the topmost member is of a substantially right-angled triangular prism shape, and additional members are of a right-angled trapezoid prism shape.

21. The structure of claim 20, wherein the expansible shape comprises a multiplicity of material receiving members.

22. The structure of claim 20, wherein the multiplicity of material receiving members are interconnected.

* * * * *